United States Patent [19]
Baker

[11] Patent Number: 5,771,130
[45] Date of Patent: Jun. 23, 1998

[54] METHOD AND APPARATUS FOR NON-CONTACT SERVO WRITING

[75] Inventor: Bill R. Baker, Redwood City, Calif.

[73] Assignee: Phase Metrics, San Diego, Calif.

[21] Appl. No.: 631,973

[22] Filed: Apr. 15, 1996

[51] Int. Cl.⁶ .................................................... G11B 21/10
[52] U.S. Cl. .......................................... 360/75; 360/77.03
[58] Field of Search ................................... 360/75, 77.03, 360/78.11; 359/223, 225, 536

[56] References Cited

U.S. PATENT DOCUMENTS

| | | | |
|---|---|---|---|
| 4,870,635 | 9/1989 | Block et al. ...................... | 360/78.11 X |
| 4,956,833 | 9/1990 | Kokado et al. ...................... | 369/44.41 |
| 4,974,109 | 11/1990 | Hoshimi et al. . | |
| 5,268,801 | 12/1993 | Hazel et al. ......................... | 360/77.03 |
| 5,315,372 | 5/1994 | Tsai .................................... | 360/77.03 X |
| 5,319,509 | 6/1994 | Michelson et al. ................... | 360/77.03 |
| 5,325,349 | 6/1994 | Taniguchi .......................... | 360/77.03 X |
| 5,442,172 | 8/1995 | Chiang et al. .................... | 360/77.03 X |
| 5,514,441 | 5/1996 | Pohto et al. ......................... | 359/536 X |

FOREIGN PATENT DOCUMENTS

| | | | |
|---|---|---|---|
| 530 698 | 10/1993 | European Pat. Off. ............. | 360/75 B |
| 5-274833 | 10/1993 | Japan .................................. | 360/75 B |
| 6-103714 | 4/1994 | Japan .................................. | 360/75 B |

*Primary Examiner*—Aristotelis M. Psitos
*Assistant Examiner*—James L. Habermehl
*Attorney, Agent, or Firm*—Blakely Sokoloff Taylor & Zafman

[57] ABSTRACT

A non-contact servo writing system for positioning a transducer on a hard disk drive arm is disclosed. The positioning system includes a master assembly having a master arm. A light source is mounted on the master arm and is reflected off a reflector mounted on the hard drive arm. A sensor mounted on the master arm receives the reflected light and generates a signal proportional to the amount of reflected light received. A servo controller coupled to the sensor controls movement of the hard drive arm in accordance to the signal generated. In one embodiment, the sensor comprises a circuit having a first photosensing element and a second photosensing element. A first signal and a second signal proportional to the amount of reflected light received by the first photosensing element and the second photosensing element respectively are generated by the circuit. The sensor also provides a sensor output signal representative of the difference between the first signal and the second signal. The sensor output signal is representative of the position of the disk drive arm with respect to the master arm. The servo controller then moves the hard drive arm in accordance with the sensor output signal. Various embodiments are disclosed.

37 Claims, 17 Drawing Sheets

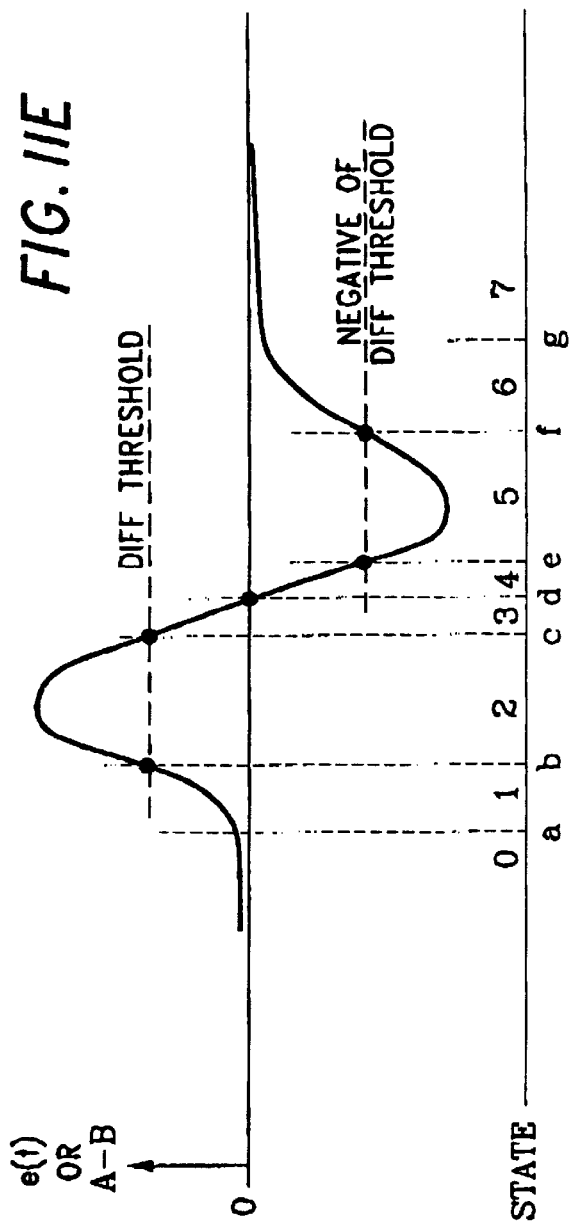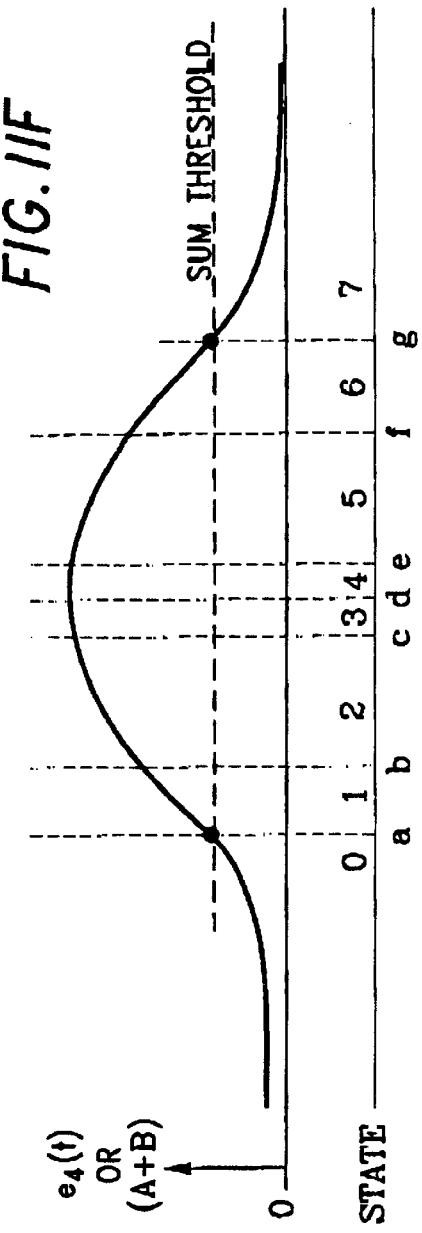

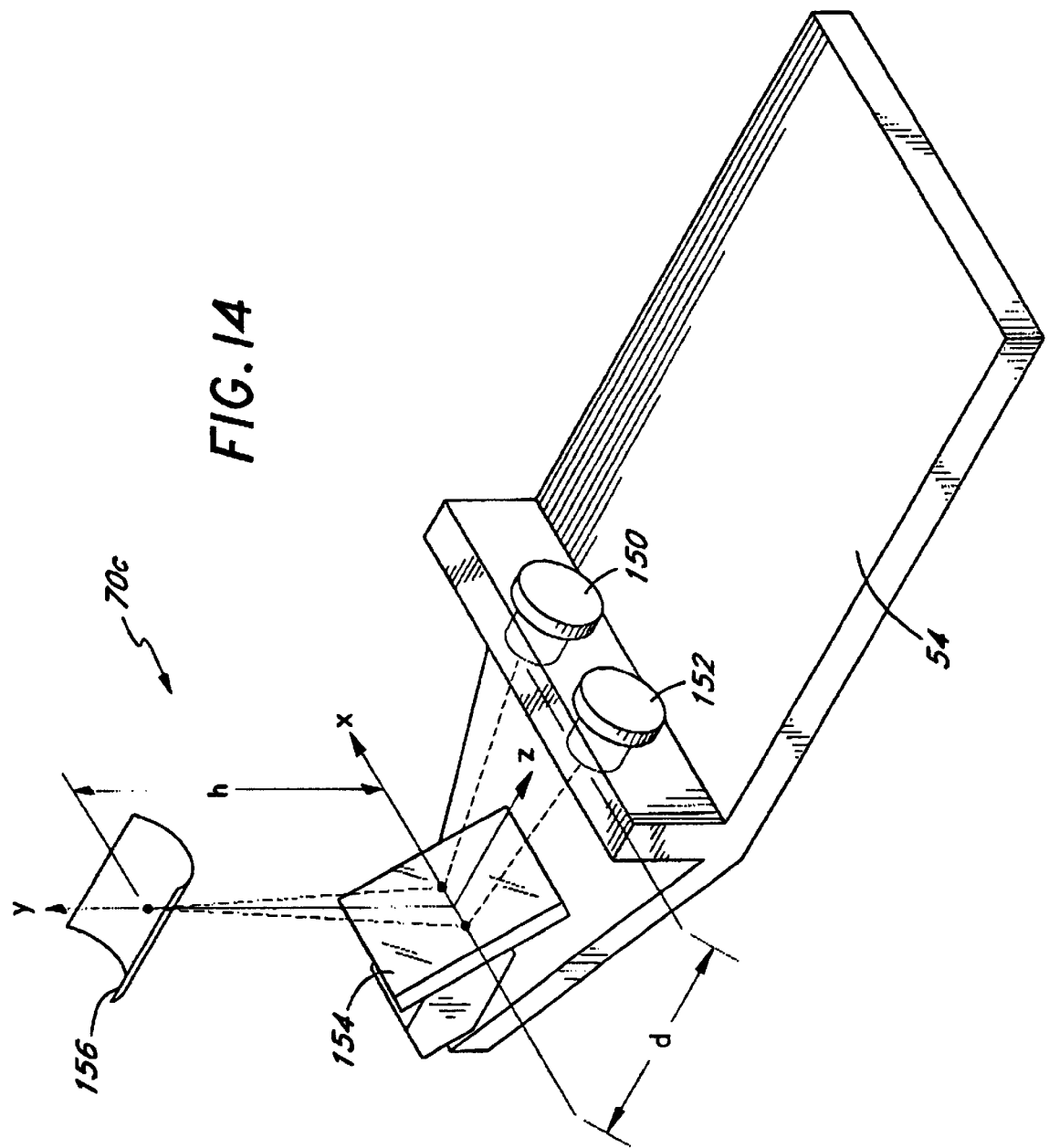

5,771,130

METHOD AND APPARATUS FOR NON-CONTACT SERVO WRITING

BACKGROUND OF THE INVENTION

1. Field of the Invention

The present invention relates in general to writing servo information on a disk of a hard disk drive, and more particularly, to a method and apparatus for non-contact servo writing.

2. Description of the Related Art

Disk drives are magnetic recording devices used for the storage of digital information. The digital information is recorded on concentric tracks on either surface of one or more magnetic recording disks. The disks are rotatably mounted on a spindle motor, and information is accessed by means of read/write heads that are mounted to actuator arms which are rotated by a voice coil motor. The voice coil motor rotates the pivoting arms and moves the heads radially over the surface of the disk(s). The read/write heads must be accurately positioned on the disk to ensure proper reading and writing of servo information which will define the data storage tracks. After the servo writer writes the servo patterns on the disks, the control system is added to the hard drive assembly.

The movement of the pivoting arms are controlled by a servo system, which utilizes servo information recorded on one or more of the disks to center the head on a particular track. The servo information is utilized to determine an actual position of the heads. The voice coil motor is utilized to move the heads if the actual head position deviates from a desired head location. The position of the heads are typically controlled by a closed loop servo system.

The servo information in the servo tracks must be written with timing derived from a master clock track in the servo writing system. Writing of servo information must be precise. The servo information is typically recorded by special instruments which contains precise mechanical positioners, such as laser interferometers.

FIG. 1 illustrates a conventional servo writing system 10, which positions the read/write heads in a magnetic disk drive from a master arm and motor. The servo writing system 10 includes a master drive assembly 12 which includes a master arm 14 that has a master voice coil motor 15. The servo writing system 10 also comprises a hard drive assembly 16 which includes a hard drive arm 18 that has a hard drive voice coil motor 19.

To ensure that the master arm 14 is accurately positioned, a laser interferometer 20 is used to measure the position of the master arm 14. This information is relayed to a master arm servo controller 22, which moves the master arm 14 to the desired track of the data storage disk in which data is to be recorded. The laser interferometer 20 detects the position of the master arm 14 by monitoring light reflected off a reflector 24 mounted on the master arm 14. This information is relayed to the master arm servo controller 22, which also receives a position command signal from an external source, such as a computer, which is programmed to coordinate servo writing.

A mechanical link between the master arm 14 and the hard drive arm 18 is established with the use of a mechanical push-pin 26, as shown in FIG. 2. The mechanical push-pin 26 is attached at one end to the master arm 14 and extends into the hard drive through an access slot. The hard drive arm 18 is biased with its motor to press against the side of the push pin and follow the master arm 14. This mechanical positioning system enables the hard drive arm 18 to track movement of the master arm 14, and thus assure writing of servo information at the proper radius of the hard drive assembly 16.

Several disadvantages exist in the use of such conventional servo writing systems. First, alignment of the axes of the master arm 14 and the hard drive arm 18 is difficult. Second, if the master arm 14 and the hard drive arm 18 are not perfectly aligned, there will be slippage between the hard drive arm 18 and the push pin 26 during operation of the servo writing system 10. This introduces error in positioning the head mounted on the hard drive arm 18. In addition, mechanical resonances are often created by the interaction between the hard drive arm 18 and the push pin 26. This further introduces error in positioning the head mounted on the hard drive arm 18.

Accordingly, there is a need in the technology for providing a non-contact servo writing system so that the problems existing in conventional mechanical push-pin servo writing systems may be eliminated.

BRIEF SUMMARY OF THE INVENTION

A non-contact servo writing system for positioning a transducer on a hard disk drive arm is disclosed. The positioning system includes a master assembly having a master arm. A light source is mounted on the master arm and is reflected off a reflector mounted on the hard drive arm. A sensor mounted on the master arm receives the reflected light and generates a signal proportional to the amount of reflected light received. A servo controller coupled to the sensor controls movement of the hard drive arm in accordance to the signal generated.

In one embodiment, the sensor comprises a circuit having a first photosensing element and a second photosensing element. A first signal and a second signal proportional to the amount of reflected light received by the first photosensing element and the second photosensing element respectively are generated by the circuit. The sensor also provides a sensor output signal representative of the difference between the first signal and the second signal. The sensor output signal is representative of the position of the disk drive arm with respect to the master arm. The servo controller then moves the hard drive arm in accordance with the sensor output signal. Various embodiments are disclosed.

BRIEF DESCRIPTION OF THE DRAWINGS

FIG. 11E is a graph of the signal e(t) with respect to sample numbers, illustrating the states used in the identification of the reflector 66 during the initial servo scan.

FIG. 11F is a graph of the signal $e_4(t)$ with respect to sample numbers, illustrating the states used in the identification of the reflector 66 during the initial servo scan.

FIG. 14 illustrates a third embodiment of the optical link assembly utilized in the non-contact servo writing system of the present invention.

DETAILED DESCRIPTION OF THE INVENTION

1. Theory of Operation

The present invention utilizes the optical leverage obtained by reflecting light off a curved reflector located on a target to control movement of the target.

Figure 1:
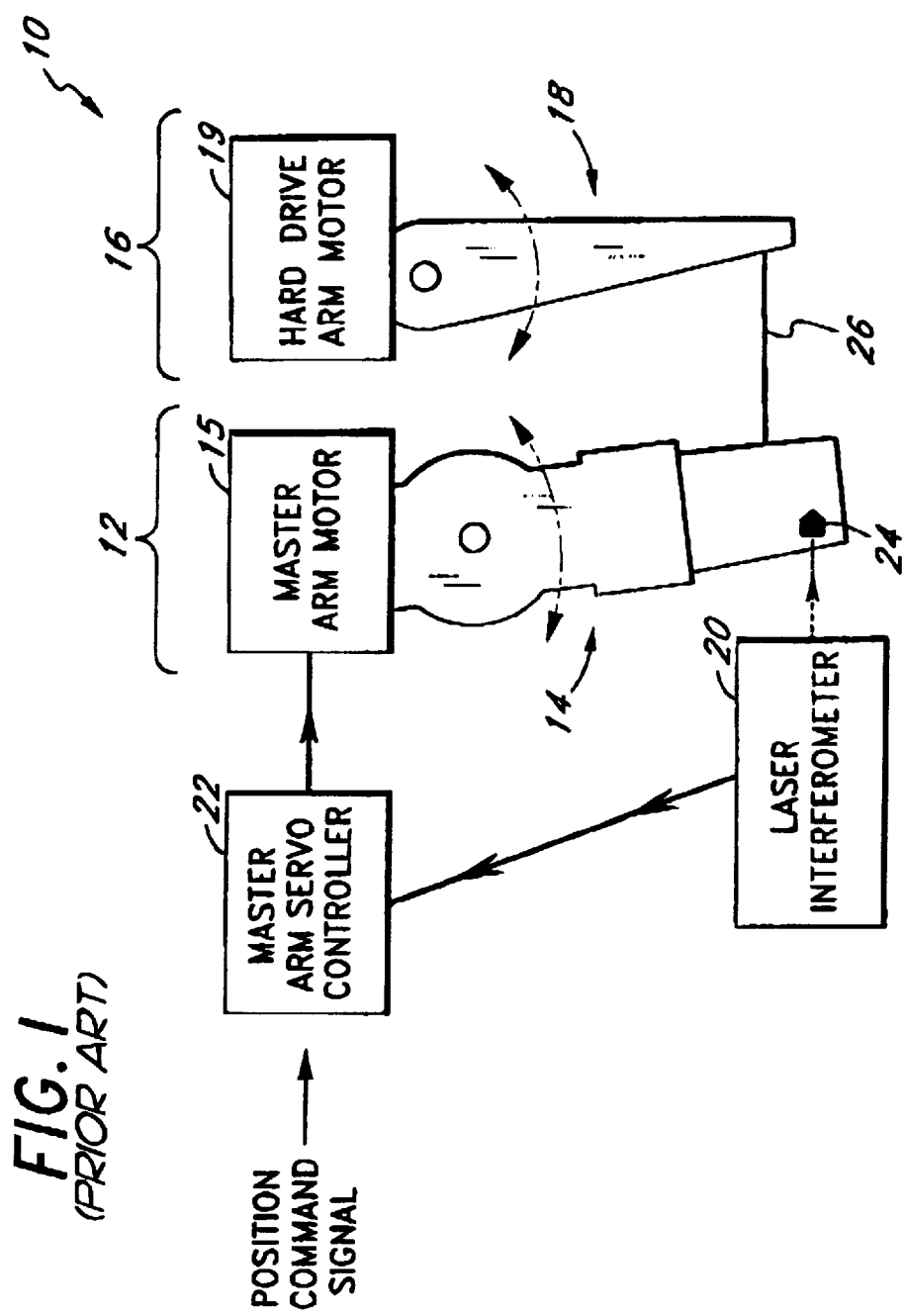
FIG. 1 is a system block diagram of a conventional servo writing system.
Figure 2:
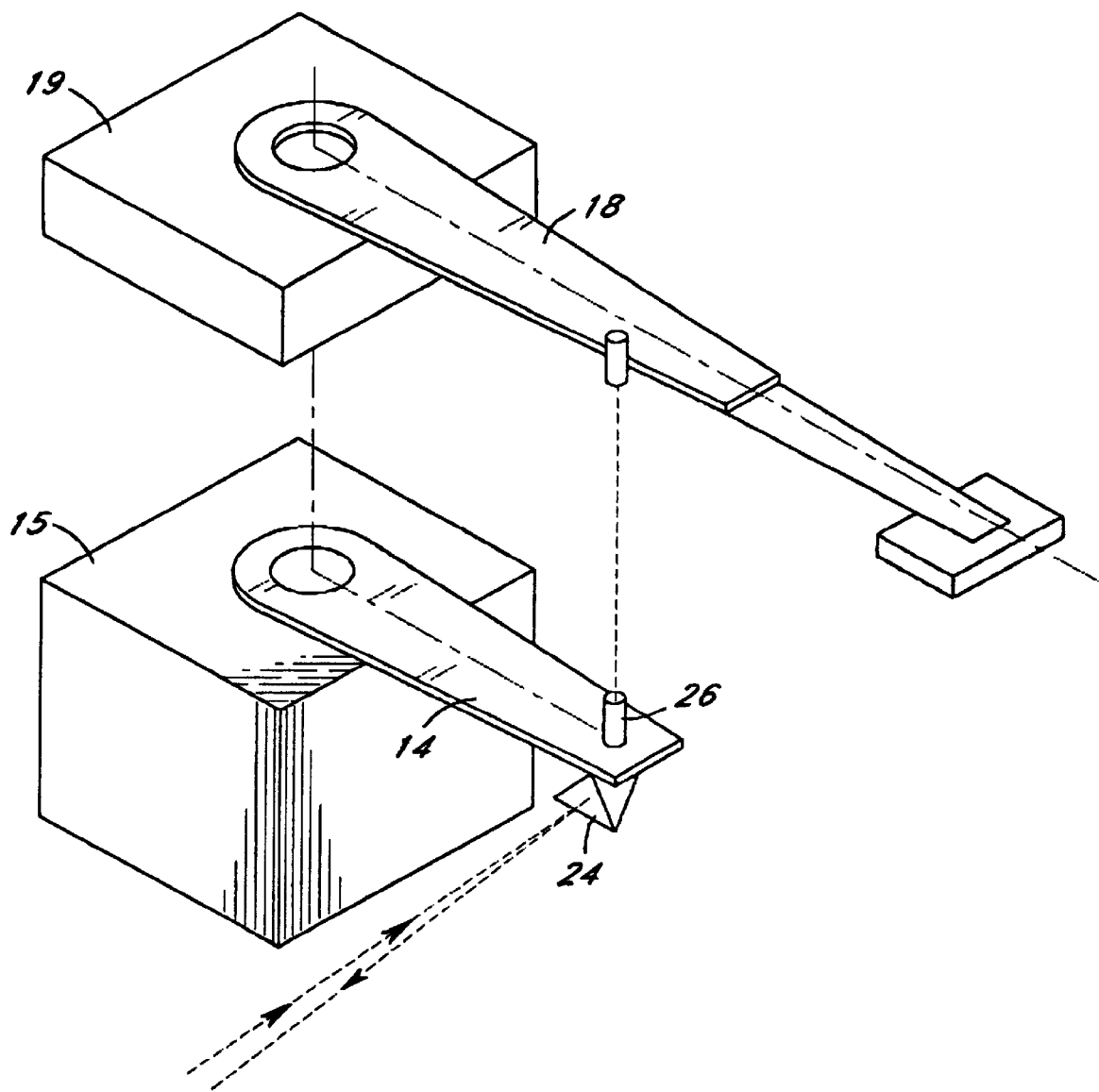
FIG. 2 is a perspective view of a portion of the conventional servo-writing system of FIG. 1.
Figure 3A:
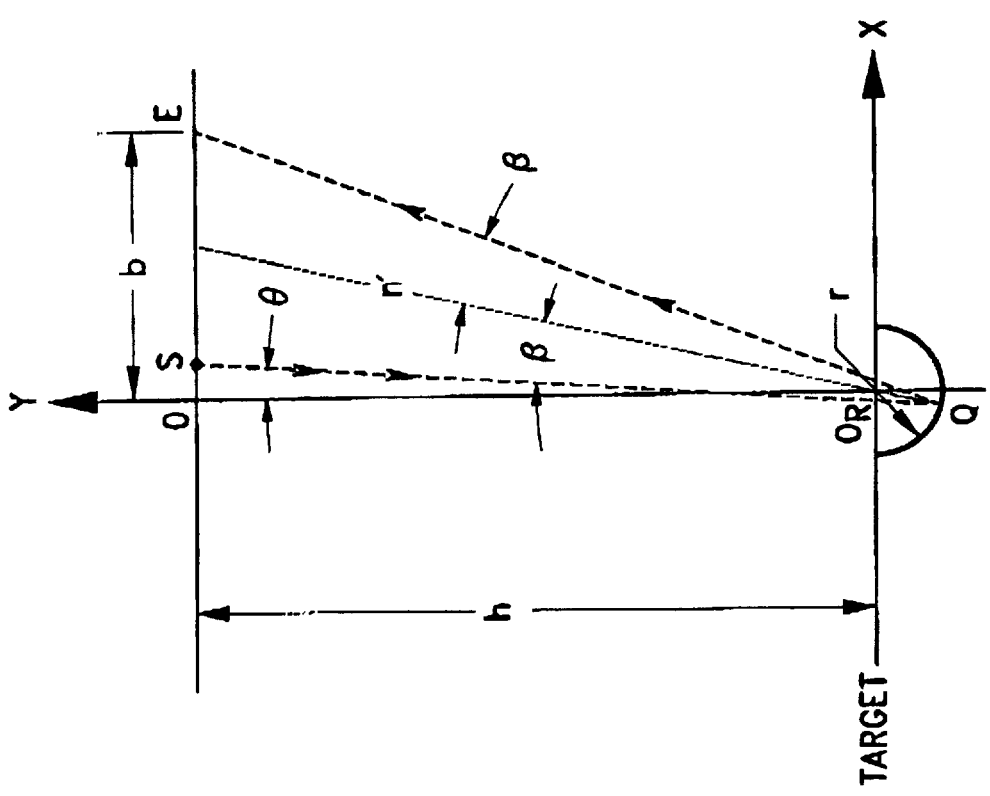
FIGS. 3A and 3B illustrate the geometrical principles of reflection as utilized in the non-contact servo writing techniques of the present invention.
Figure 3B:
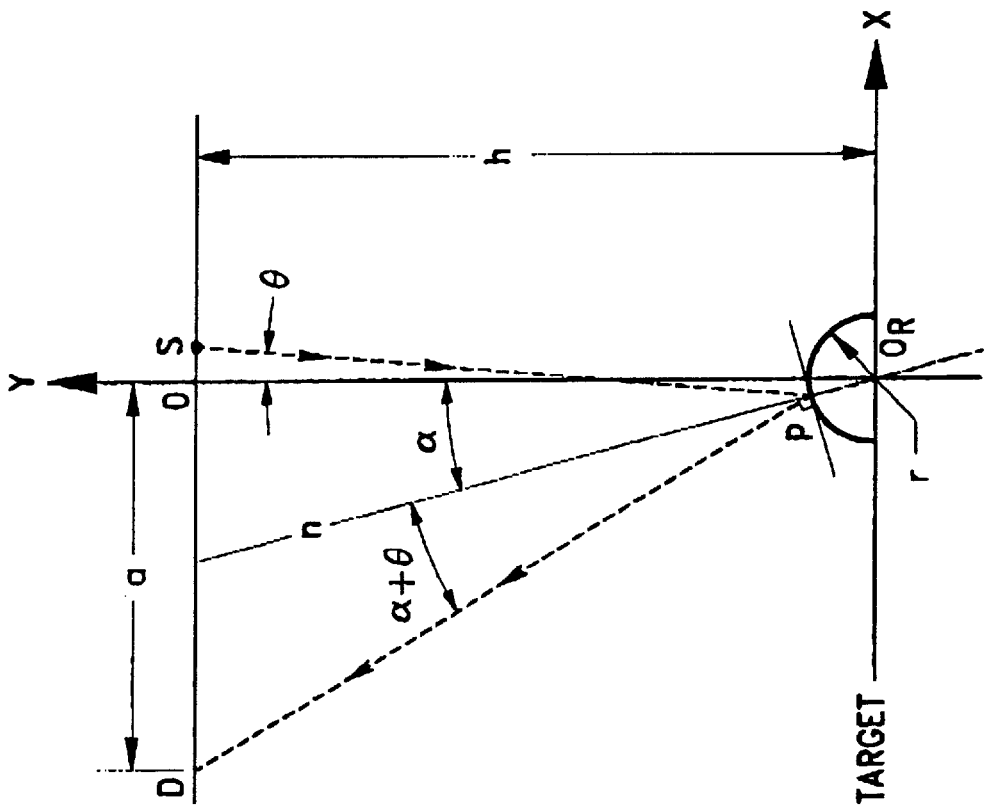

FIG. 3A and 3B illustrate the geometrical principles of reflection as utilized in the non-contact servo writing technique of the present invention. In FIG. 3A, light is emitted from a source S and is reflected off a convex reflector located on a target, having a radius r and center $O_R$. The reflected light is detected at point D, which lies along the line DO. DO is parallel to the x-axis and is separated from the x-axis by a perpendicular line, $OO_R$, which lies along the y-axis. The distance between D and O is a. The source S may be offset from the reflected rays at an angle θ with respect to the y-axis. Using the convex reflector as shown in FIG. 3A, the incident ray is reflected at the point of incidence P, towards D, so that xp=−r sinα

$y_p$=r cosα a=$x_p$−(h−$y_p$) tan (2α+θ)

where n is normal to the reflector at the point of incidence P, α is the angle between the incident ray and the vertical line $OO_R$; and h is the distance between O and $O_R$. Using small approximations for θ, α<<1, the following expression is obtained:

$x_p$=−rα

$y_p$=r a=−rα−(h−r) (2α+θ)=−(2h−r)α−(h−r)θ

For θ=0, the optical leverage obtained is:

$$M = \frac{\Delta a}{\chi_p} \approx \frac{2h-r}{r} \gg 1.$$

For example, if h=1 cm (approximately 0.4") and r=0.5 mm (approximately 0.02 inches), the optical leverage obtained using the aforementioned system is:

$$M \approx \frac{2 \times 10 - 0.5}{0.5} \approx 39.$$

If a convex reflector as shown in FIG. 3B is used instead, (where the light is reflected at Q below the target surface) the direction of transit of the reflected ray is reversed. In this embodiment, S is the source, Q is the point of incidence, n' is the normal at the point of incidence Q, β is the angle between the incident ray and n', and E is the point of incidence of the reflected ray on line OE.

Using both a concave and a convex reflector would produce reflections traveling in opposite directions on the sensor plane. This could help distinguish the desired target from spurious reflections from the edges of the hard drive arm.

2. Implementation

Figure 4:
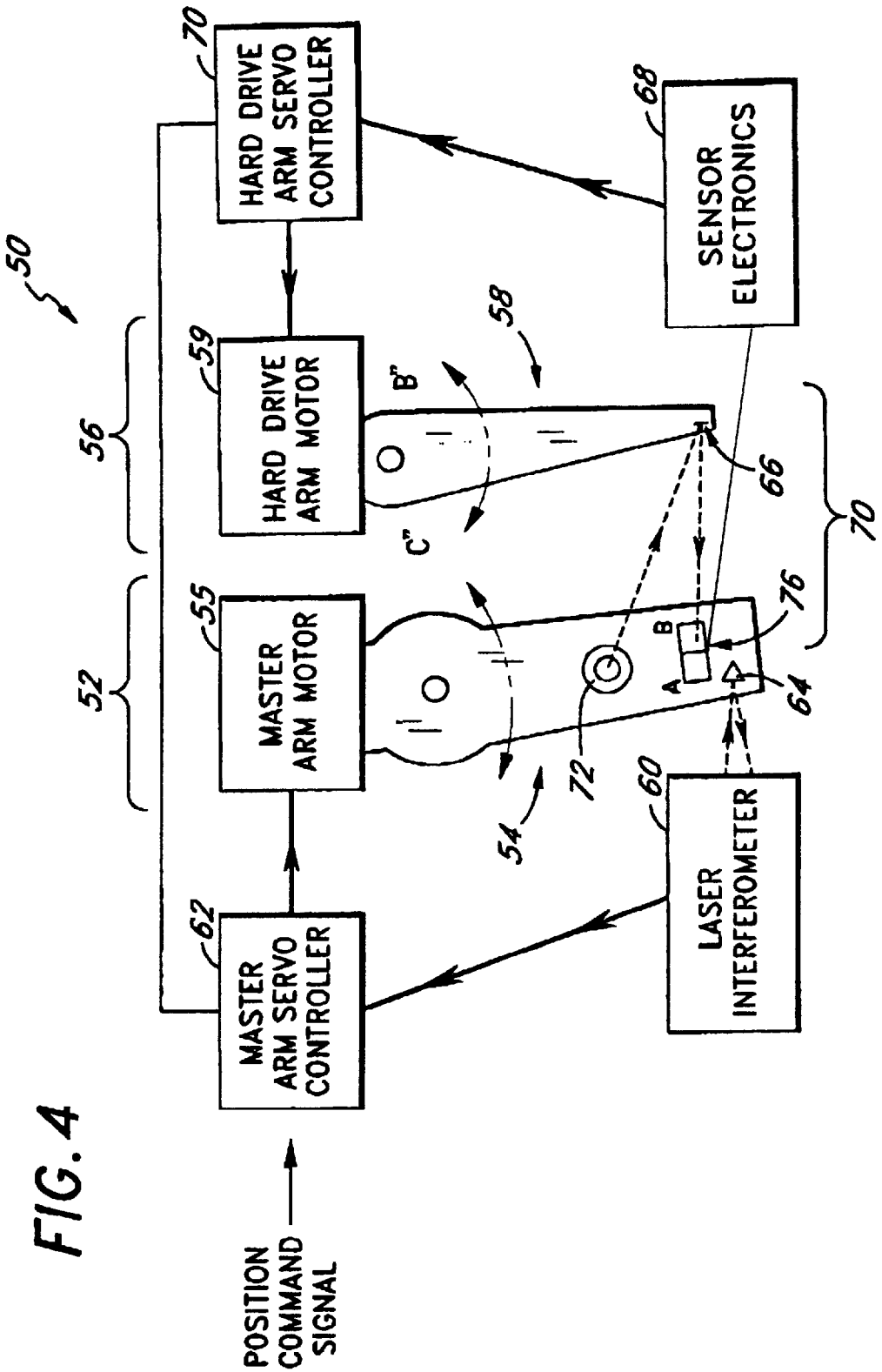
FIG. 4 is a system block diagram of the non-contact servo track writing system of the present invention.
Figure 5:
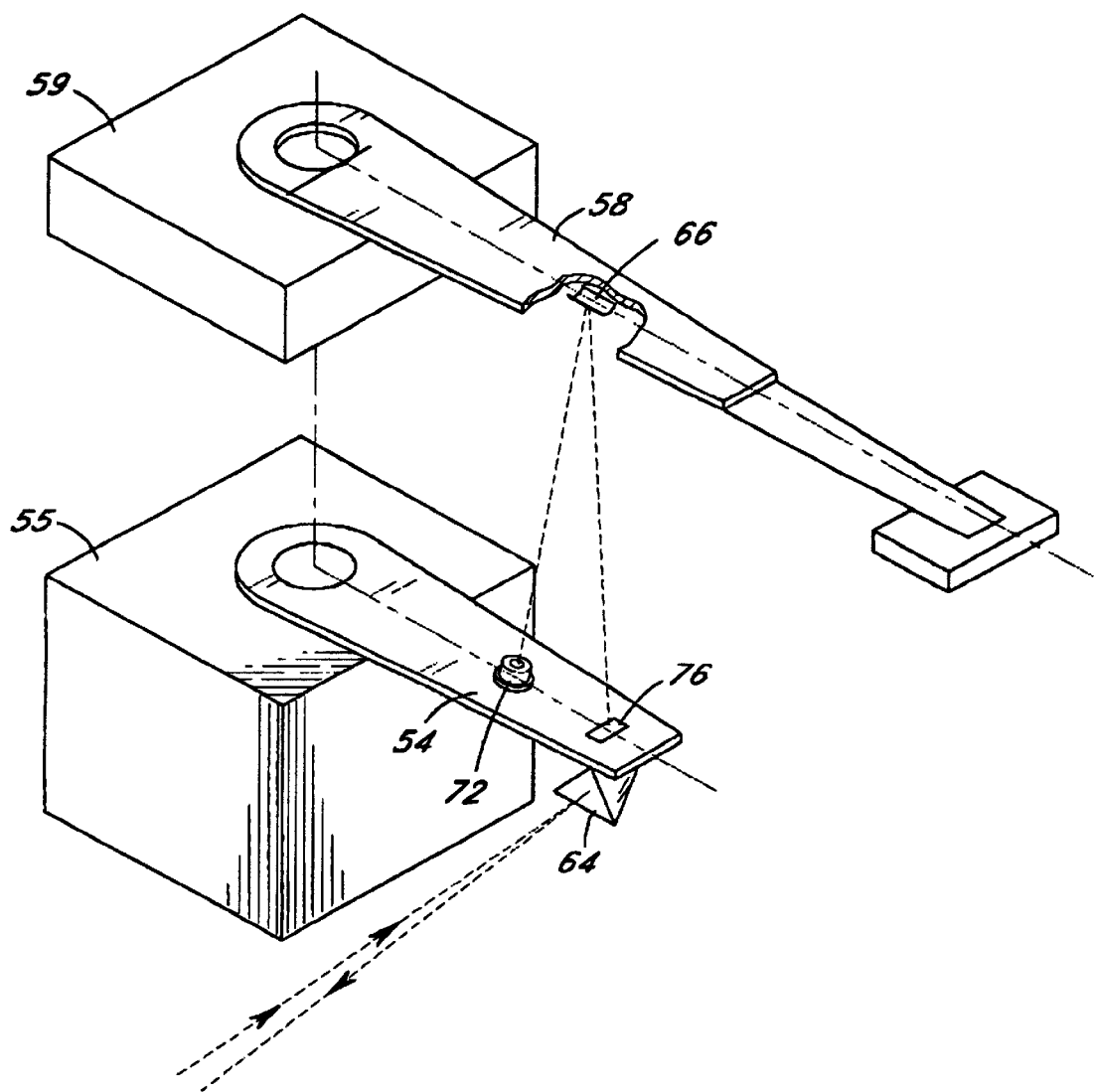
FIG. 5 is a perspective view of a portion of the non-contact servo writing system of FIG. 4.

FIG. 4 illustrates a servo writing system 50 of the present invention, which positions the read/write heads in a magnetic disk drive from a remote location. FIG. 5 is a perspective view of a portion of the non-contact servo writing system of FIG. 4. The servo writing system 50 includes master drive assembly 52 which includes a master arm 54 that ha a master voice coil motor 55. The servo writing system 50 also comprises hard drive assembly 56 which includes a hard drive arm 58 that has a hard drive voice coil motor 59. The master drive assembly 52 reads servo information off a master clock track. A clock head inserted into the hard drive assembly 56 write a clock track at the edge of one disk of the hard drive assembly 56. The clock head reads the clock track continuously to provide the time base to synchronize all servo information written by the servo writing system 50 through the hard drive assembly 56 data heads. An example of such a clock head is described in co-pending U.S. Patent Application entitled "Method and Apparatus of Captive Clock Head Assembly," filed on Apr. 15, 1996, which is assigned to the assignee of the present invention.

To ensure that the master arm 54 is accurately positioned, laser interferometer 60 detects he position of the corner cube reflector 64 on the master arm 54, and relays this information to a master arm servo controller 62 which moves the master arm 54 and hence the hard drive arm 58, to the desired radius of the data storage disk on which servo data is to be recorded. The position of the master arm 54 controls the movement of the hard drive arm 58 through an optical link so that the hard drive arm 58 will be guided by the master arm 54 to move to the desired radius of the data storage disk. The laser intererferometer 60 detects the position of the master arm 64 by monitoring light reflected off a reflector 54 mounted on the master arm 54. This information is relayed to the master arm servo controller 62, which also receives a position command signal from an external source, such as a computer, which is programmed to coordinate servo writing. The master arm servo controller 62 responds to the position command signal to control the movement of the master arm 54.

The hard drive assembly 56 and the master drive assembly 52 may be sealed. In that case, the hard drive assembly 56 has a cover with a small clear plastic window, aligned with the travel of the master arm 54, so that the transducer mounted on the hard drive arm 58 is visible through the travel of the hard drive arm 58. A reflector 66 is attached to the top of the hard drive arm 58 below this window.

In one embodiment, the reflector 66 is small piece of stainless steel of 0.004" in thickness, which had been stamped into the head suspension flexure of the hard drive arm 58 to provide a section of a cylinder with a diameter of about 1 mm. In another embodiment, the reflector 66 is a half cylinder, ground from a polished rod of 1 mm diameter. The third embodiment includes a plastic form sputtered with a reflective coating, which is cemented to the hard drive arm 58. This embodiment is obtained by molding, pressing, rolling or engraving a thin (approximately 0.005 or 0.010 inch) sheet of plastic with the desired shape. Then, a thin reflective film of metal can be sputtered on top of the plastic. (This sputtering method is used to make reflective window films and to form the magnetic films of the hard drive assembly.) In these three embodiments, the reflector 66 should have a smooth crown, and its surface must be smooth and highly reflective. Other examples can be made by pressing aluminum foil over a wire or pin.

Figure 6:
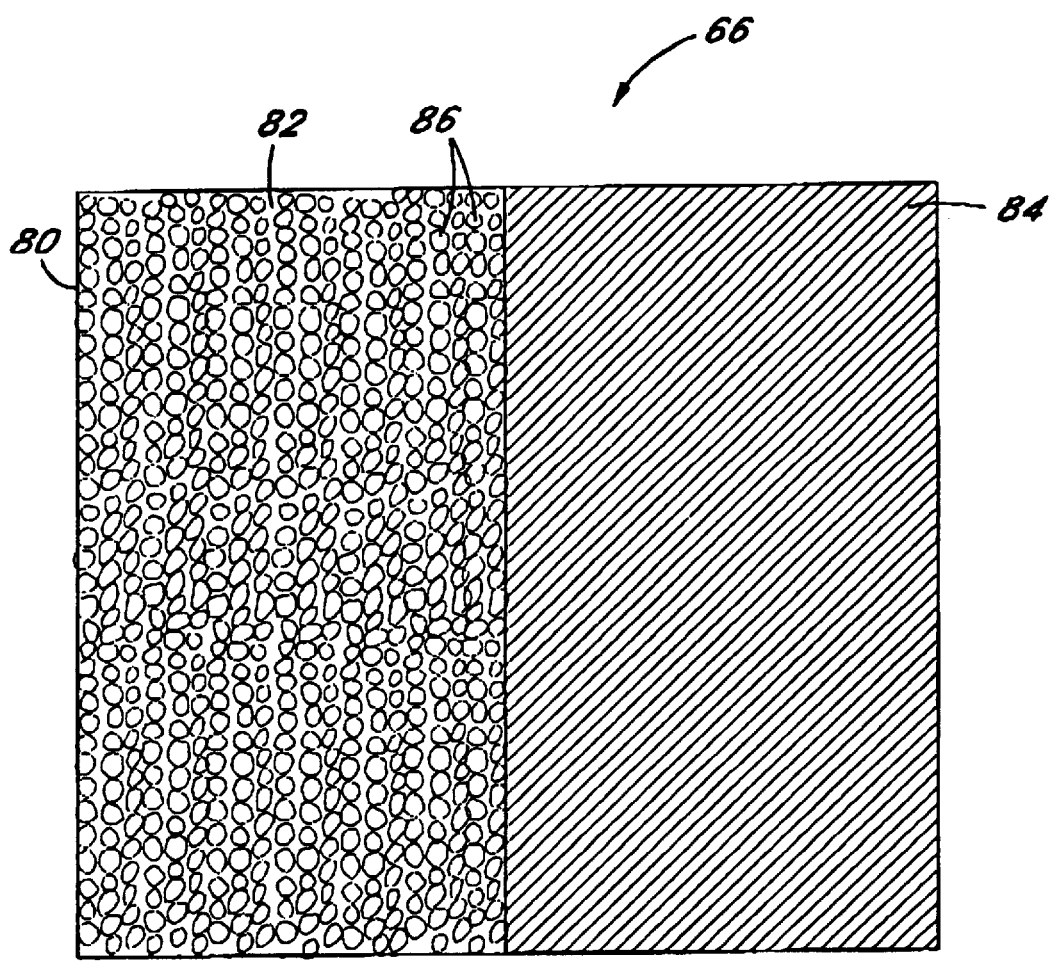
FIG. 6 is an enlarged view of one embodiment of the reflector used in the servo writing system of FIGS. 4 and 5.

In a fourth embodiment, the reflector 66 includes a substrate 80 that is divided into a first portion 82 and a second portion 84, as shown in FIG. 6. The first half 82 is located with a reflective paint such as a white paint while the second half 84 is coated with a non-reflective paint such as black paint. An array of glass beads or glass spheres can be used to enhance reflectivity of the first half 82 of the substrate 80 using epoxy. An example of the glass spheres is produced by 3M under the part designation Scotch Lite.

With reference to FIGS. 4 and 5, the optical link between the master drive arm 54 and the hard drive arm 58 is established with the use of a position sensor 76 which is located external to the hard drive assembly 56. The optical positioning system 70 aligns the hard drive arm 58 with the master 54 so that servo information may be written using the master clock track for synchronization. This optical positioning system 70 is located within the master arm 54 which carries a focused source 72 of light. The reflector 66 on the hard drive arm 58 reflects the light, and the returned beam is received by the position sensor 76. The position sensor 76 which senses the relative position of the hard drive arm 56 as discussed in detail in the following sections and generates a signal corresponding to the position of the hard drive arm. This information is relayed to the position sensor electronics 68, which subsequently forwards a signal to the hard drive arm servo controller 70. The hard drive arm servo controller 70 utilizes this information to control the position of the hard drive arm 58, and to adjust the position of the hard drive arm 58 if necessary.

Movement of the hard drive arm 58 in one direction increases illumination of the sensor 76 and movement in the opposite direction decreases it. Based on the amount of illumination, a voltage proportional to the position of the transducer mounted on the hard drive arm 58, is obtained. This signal is used together with suitable gain and compensation, to control the position of the hard drive arm 58.

The sensor 76 generates a signal corresponding to the position of the transducer mounted on the hard drive arm 54. This information is relayed to an external positioning sensor 68, which subsequently forwards a signal to a hard drive arm servo controller 70. The hard drive arm servo controller 70 utilizes this information to control the position of the hard drive arm 58, and to adjust the position of the hard drive arm 58 if necessary.

When the servo writing system 50 is initially started up, the hard drive arm 58 is positioned at some intermediate radius determined largely by the aerodynamic drag forces acting on the head mounted on the hard drive arm 58. The master arm 54 is scanned across the hard drive assembly 56 and the sensor 76 returns signals from reflections from the disk surface, from the edges of the hard drive arm 58, etc. These reflections can take on all possible values. One aspect of the present invention is a technique and apparatus for identifying the true signature of the reflector 66 so that the servo loop can be closed near the zero crossing when the master arm 54 and the hard drive arm 58 coincide. Details of this aspect of the invention will be discussed in detail below.

Figure 7:
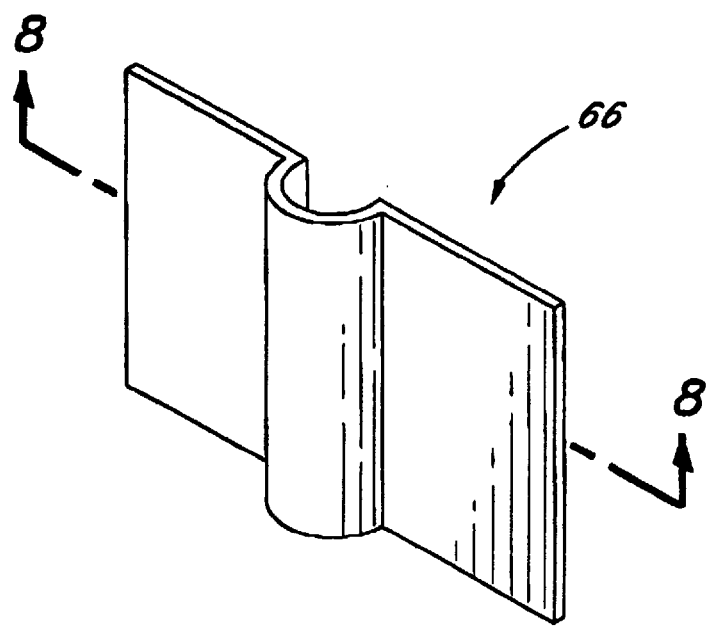
FIG. 7 is an enlarged view of one embodiment of the reflector 66 of FIGS. 4 and 5.
Figure 8:
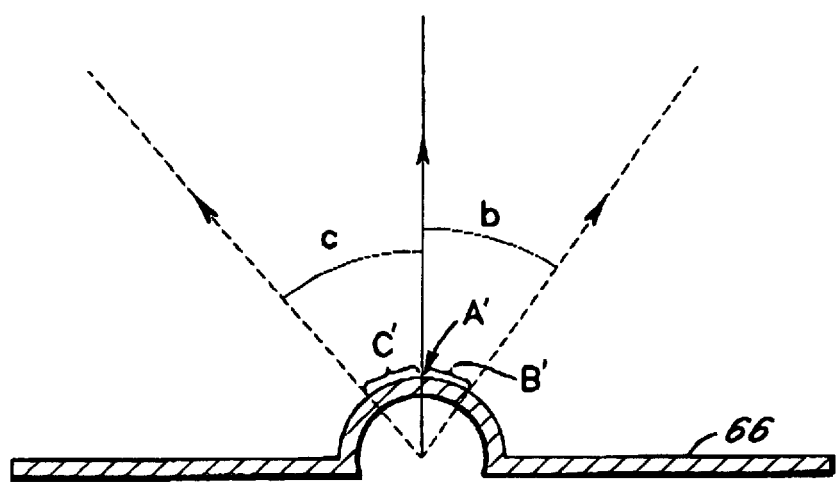
FIG. 8 is a cross sectional view of the reflector 66 taken along line 8—8 of FIG. 7.
Figure 9:
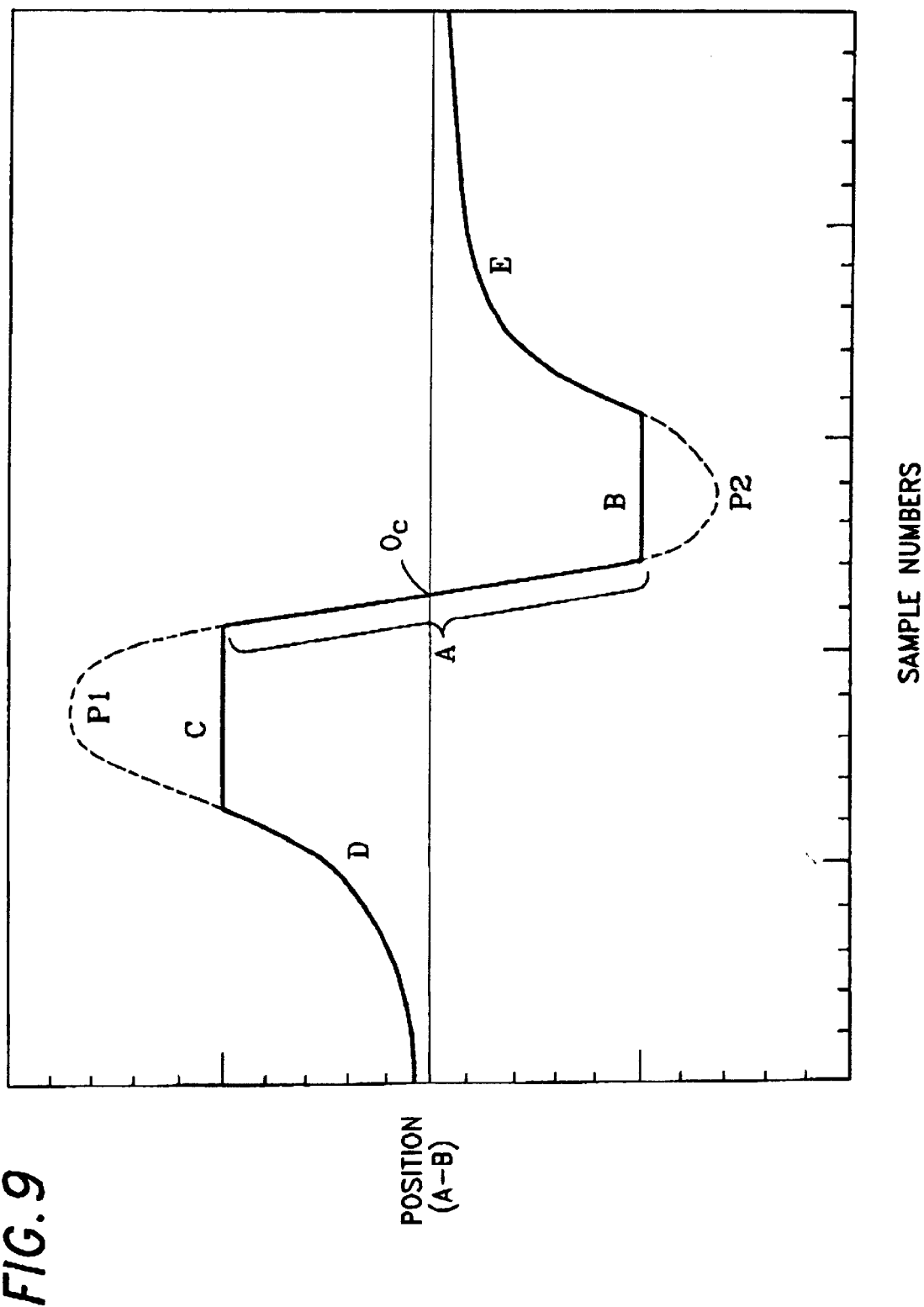
FIG. 9 is a graph of the signal representing the light reflected off reflector 66, as received by the sensor 76 of FIGS. 4 and 5.

FIG. 7 is a perspective view of one embodiment of the reflector 66 and FIG. 8 is a cross-sectional view of the reflector 66 taken along line 8—8. In this embodiment, the reflector 66 is a half cylinder with a smooth crown. FIG. 9 is a graph illustrating the range of signals which may be generated by sensor 76, corresponding to the range of angles of reflected light received by sensor 76. In FIG. 9, the linear region A represents a portion of a signal corresponding to light that is reflected from the area near the center A' of the reflector 66 (see FIG. 8), while the linear region B represents a portion of a limited form of the signal corresponding to light that is reflected at an angle to the right B' of the center of the reflector 66 (see FIG. 8), and the linear region C represents a limited form of the light that is reflected at an angle to the left C' of the center of the reflector 66 (see FIG. 8). When a signal $O_c$ corresponding to light reflected off the center A' is received, it indicates that the hard drive arm 58 is tracking the master arm 54 accurately, and no adjustment is required.

When light reflected off B' is received (see FIG. 8), corresponding to the signal range $O_c$BE in FIG. 9, it indicates that the hard drive arm 16 has to be adjusted by moving the arm 58 to its left side (i.e., in the direction B" in FIG. 4) in an amount proportional to the angle of reflection b. When a signal in the range $O_c$CD corresponding to light reflected off C' is received (see FIG. 8), it indicates that the hard drive arm 16 has to be adjusted by moving the arm 58 to its right (i.e., in the direction C" in FIG. 4) in an amount proportional to the angle of reflection c. It should be noted that the portions of the signal shown (in FIG. 9) in a solid line (i.e. segments C and D) have been limited through the use of a limiter (one for each segment C or D), so that the capture range of the signal may be extended. After capturing or locking on to the desired operational point (typically $O_c$), the servo system operates in a very small region near $O_c$, where the simple, steep segment A of the signal is used. Without limiting, the usable region of the signal terminates at the peaks P1 and P2 (shown in dotted lines), rendering the portion of the signal to the left of PI and the portion of the signal to the right of P2 useless. This is because control systems utilizing derivative information based on the signal would fail when the signal is outside the interval P1 to P2.

As shown in FIG. 9, if the light is reflected at an angle to the right (B') of the center of the reflector 66, or to the left (C') of the center of the reflector 66, the signal generated by the sensor 76 may no longer be in the linear regions A, B or C. In particular, if the light is reflected at a sufficiently large angle, the signal generated by the photodetector 76 will fall within the range D or E, where the signals are no longer monotonically increasing or decreasing with respect to the position of the arm 58. When the servo controller 70 receives signals in these regions, it is difficult for it to determine the direction that the hard drive arm 58 should be moved. One aspect of the present invention includes an apparatus for retaining the value of the signal when the signal is at a peak (i.e. at either B or C in FIG. 9) so that the information regarding the relative position of the hard drive arm 58 may be retained. This also enables the servo controller to retain position information when the signal extends beyond the linear range. The retained position information may be retrieved for later use or reference.

Figure 10:
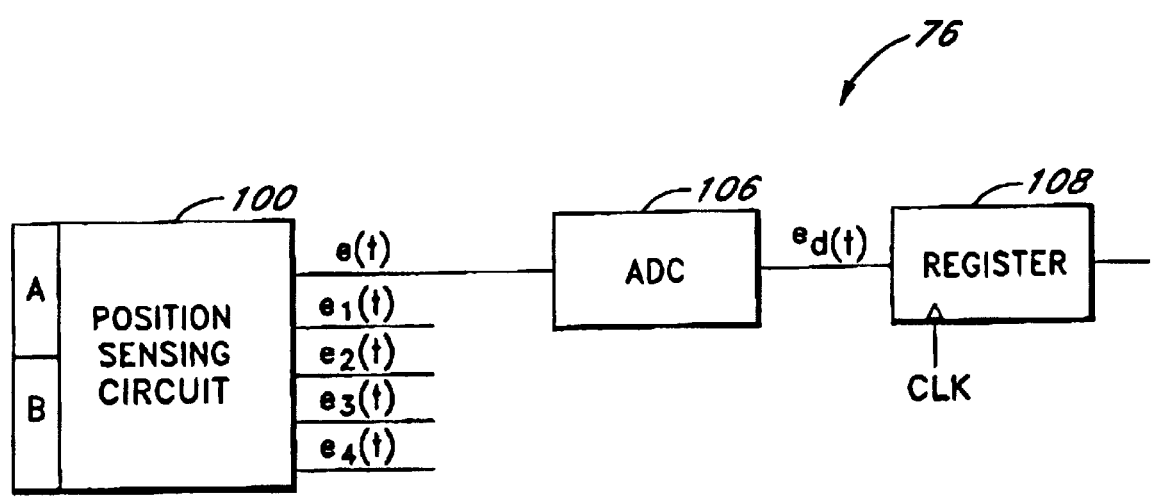
FIG. 10 illustrates one embodiment of the sensor 76 of the present invention.

FIG. 10 illustrates one embodiment of the position sensor 76 of the present invention. The position sensor 76 comprises a position sensing circuit 100 having a first output and second to fifth outputs. The first output of the position sensing circuit 100 is coupled to an analog-to-digital converter (ADC) 106 which is in turn coupled to a storage circuit such as a register 108. The register 108 is enabled by a clock signal. The second to fifth outputs of the position sensing circuit 100 are used in identifying the reflector 66 signature.

In one embodiment, the position sensing circuit 100 comprises a photodiode 110 (see FIG. 11A), which includes two photosensing cells 110a and 110b comprised of two photosensing elements located on a single substrate. When a light beam is centered on the cells of the photodiode 110, the output current from each element A and B are equal, indicating that the light beam is centered in the middle of the photodiode 110. As the beam moves, a current imbalance occurs, indicating an off-center position, as will be described in detail in the following sections. An example of such a circuit is the position sensing PIN circuit manufactured by UDT Sensors, Inc., under the part designation SPOT-3D.

The position sensing circuit 100 generates a signal e(t) representative of the difference between the output currents of the photodiode 110. This difference value is indicative of whether the light beam is centered exactly between the cells A and B of the photodiode 110, so that no adjustment is required by the servo system, or whether the light beam is off-centered, indicating that the hard drive arm has to be adjusted. The signal e(t) is provided to an analog-to digital converter 106, which digitizes the signal e(t). The digitized signal $e_d(t)$ is clocked into register 108. In an embodiment utilizing a 12-bit ADC 106, the light beam is located on the element B (see FIG. 7) if the output of the ADC 106 is between 0 and 2047. In the same embodiment, the light beam is located on the element A if the output of the ADC 106 is between zero and −2048. In this manner, the position sensing circuit 100 may hold the value of the most current sensor position, so that the exact location of the off-centered light beam may be ascertained. The value of the sensor position is subsequently provided to the hard drive arm servo controller 70 via sensor electronics 68 (see FIG. 4). The hard drive arm controller 70 generates an output signal representative of the direction and magnitude of movement for controlling the hard drive arm 58. The position sensing circuit 100 also generates four other outputs $e_1(t)$, $e_2(t)$, $e_3(t)$ and $e_4(t)$, which are used to identify the true signature of the reflector 66 as the master arm 54 (see FIG. 4) is scanned across the hard drive assembly 56. This aspect of the present invention will be discussed in detail in the following sections.

Figure 11A:
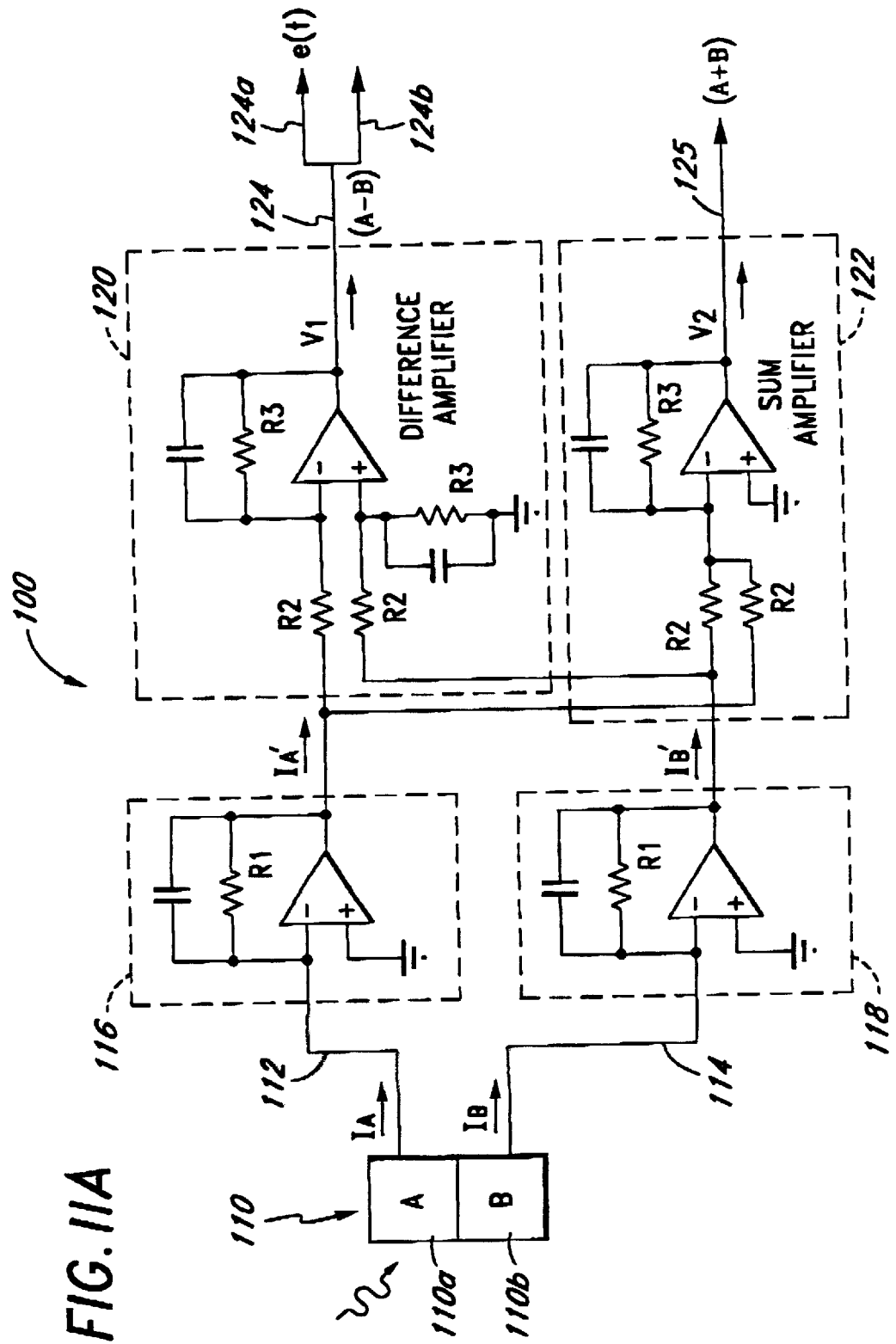
FIG. 11A is a circuit diagram of the position sensing circuit 100 of FIG. 10.

FIG. 11A is a circuit diagram of the position sensing circuit 100. The position sensing circuit 100 includes two photosensing cells 110a and 110b. The photosensing cell 110a includes a photosensing element A and the photosensing cell 110b includes a photosensing element B. The photosensing elements A and B are located on a single substrate. Light detected by the photosensing elements A and B are provided as output currents $I_A(t)$ and $I_B(t)$ which are provided via signal lines 112 and 114 to transimpedance amplifiers 116 and 118 respectively. The transimpedance amplifiers 116 and 118 amplify the currents $I_A(t)$ and $I_B(t)$ to provide an output current $I_{A'}(t)$ at the output of amplifier 116 and a current $I_{B'}(t)$ at the output of amplifier 118. $I_{A'}(t)$ and $I_{B'}(t)$ are provided to a difference amplifier 120 and a sum amplifier 122. In response, the difference amplifier 120 generates a voltage V1 which represents the difference between $I_{A'}(t)$ and $I_{B'}(t)$ (represented in FIG. 11A and hereinafter as A–B), while the sum amplifier 122 generates a voltage V2 which represents the sum of $I_{A'}(t)$ and $I_{B'}(t)$ (represented in FIG. 11A and hereinafter as A+B). The output of the difference amplifier 120 is provided as the output signal e(t) (see FIG. 10) via signal line 124a and also provided as an input to a comparator circuit 104 (see FIG. 11B) via signal line 124b. The output of sum amplifier 122 is provided via signal line 125 to the comparator circuit 104 (see FIG. 11B).

Figure 11B:
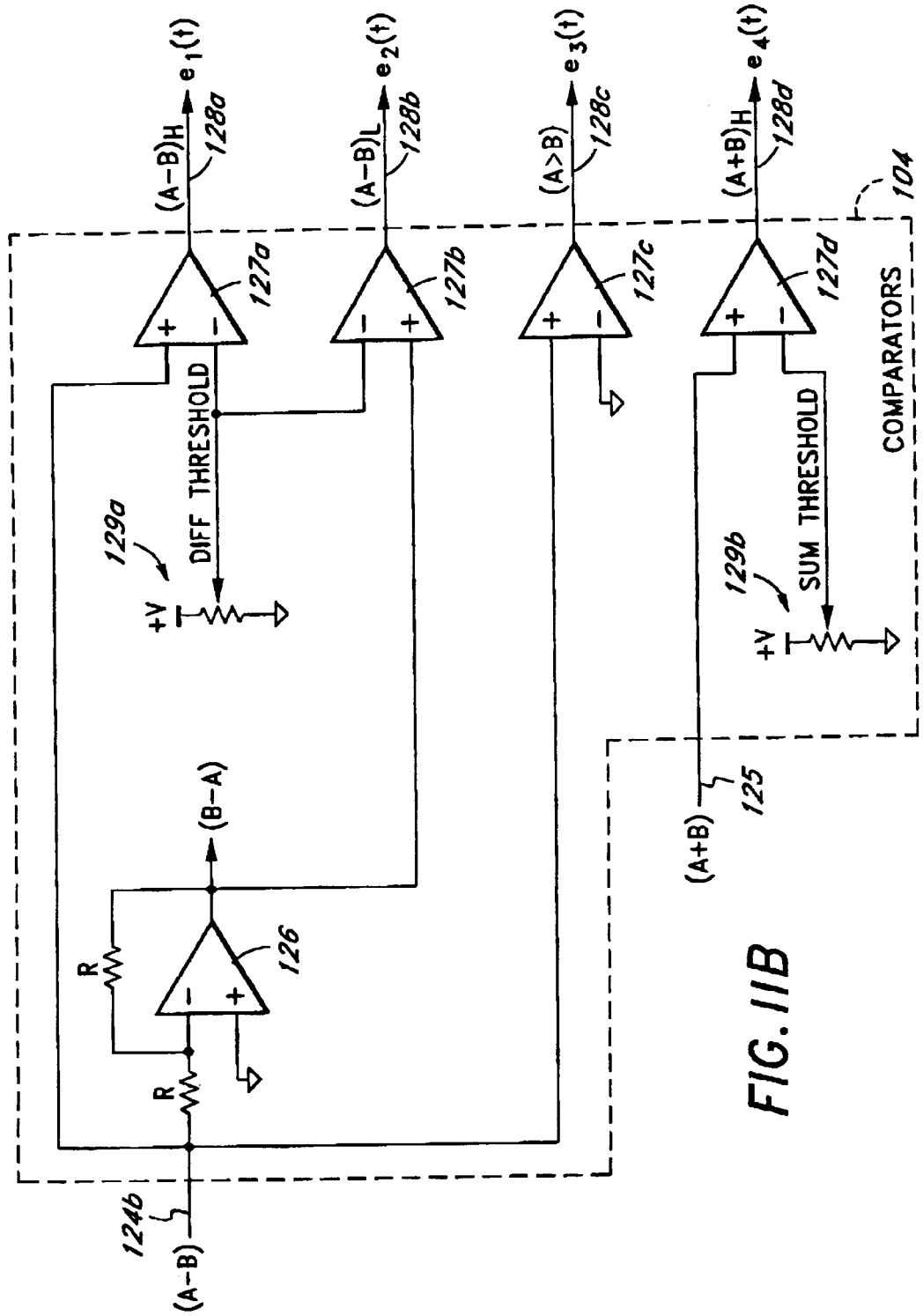
FIG. 11B is a circuit diagram of a comparator circuit utilized in the position sensing circuit 100 of FIG. 10.

FIG. 11B is a circuit diagram of a comparator circuit of the position sensing circuit 100 of FIG. 10. The comparator circuit 104 is used to identify the signature of the signal e(t) generated as a result of reflection of light off the reflector 66. The output of difference amplifier 120, i.e., (A–B), is provided as an input to an operational amplifier 126 which is arranged in an inverting configuration. The operational amplifier 126 inverts the input (A–B) to provide an output (B-A). The output of difference amplifier 120, i.e., (A–B), is also provided as one input to the noninverting terminal of a comparator 127a and as one input to the noninverting terminal of a comparator 127c. The output of the amplifier 126 is provided as an input to the noninverting terminal of another comparator 127b. The inverting terminals of comparators 127a and 127b are connected to a difference threshold circuit 129a, while the inverting terminal of comparator 127c is grounded. The output of sum amplifier 122, i.e., (A+B), is provided to the noninverting terminal of a comparator 127d, while the inverting terminal of the comparator 127d is connected to a sum threshold circuit 129b.

In operation, the comparator 127a will generate an output $e_1(t)$ if the signal (A–B) is above a difference threshold, as set by the difference threshold circuit 129a. The comparator 127b will generate an output $e_2(t)$ if the signal (B-A) is below the negative of the difference threshold, as set by the difference threshold circuit 129a. The comparator 127c will generate an output $e_3(t)$ as long as the value of A is larger than that of B. Finally, the comparator 128d will generate a signal $e_4(t)$ if the value of (A+B) is above a sum threshold, as set by the sum threshold circuit 129b.

Figure 11C:
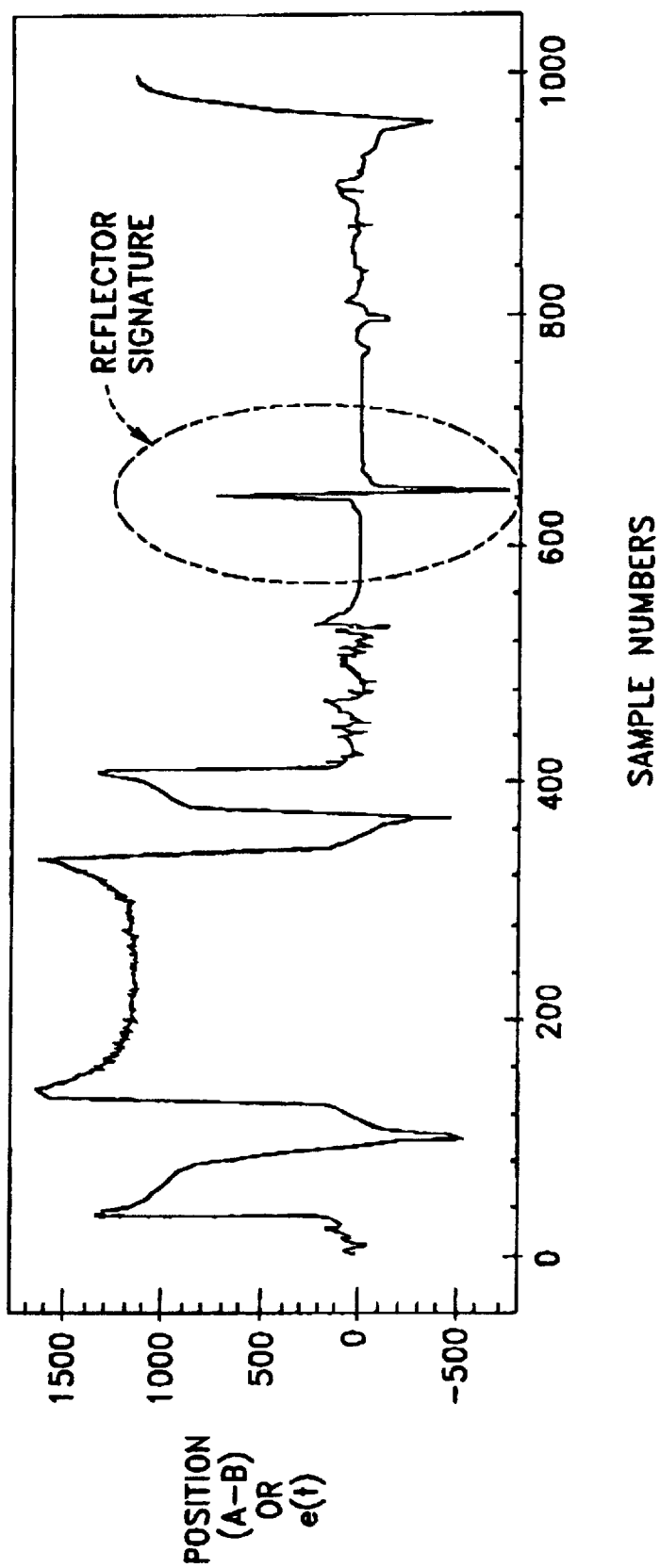
FIGS. 11C is a graph of the position of the hard drive arm 58 as represented by the signal e(t) with respect to sample numbers.

FIGS. 11C is a graph of the position of the hard drive arm 58 as represented by the signal e(t) with respect to sample numbers. When the light from the light source 72 (see FIG. 4) strikes the sides of the cylindrical reflector 66, the light is deflected widely, leaving a quiet zone. In the example shown in FIG. 11A, this quiet zone is in the range of samples from approximately number 550 to number 620. Then, the distinctive dipulse shape of the region near the crown of the cylindrical reflector 66 appears. This is followed by another quiet zone, approximately for samples 680 to 760.

Figure 11D:
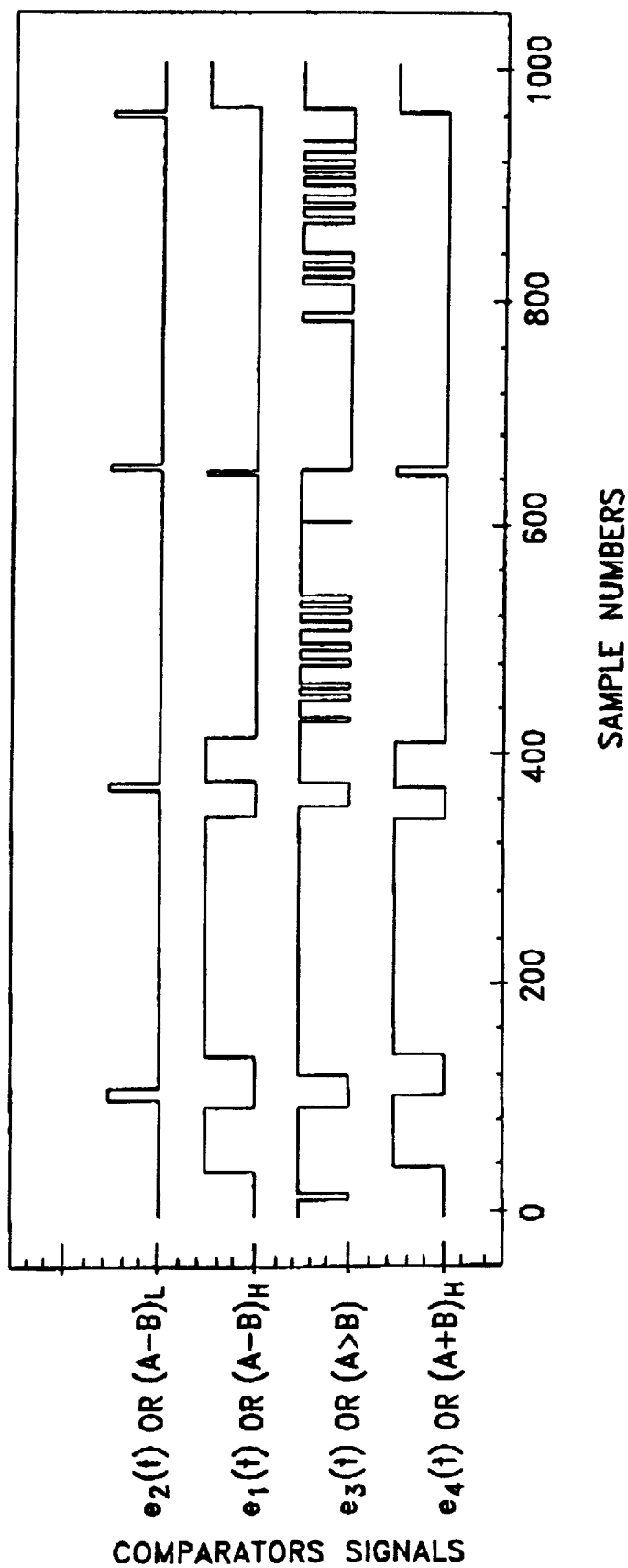
FIG. 11D is a graph of the output signals $e_1(t)$, $e_2(t)$, $e_3(t)$ and $e_4(t)$ of FIG. 10 with respect to sample numbers.

FIG. 11D is a graph of the output signals $e_1(t)$, $e_2(t)$, $e_3(t)$ and $e_4(t)$ of FIG. 10 with respect to sample numbers. As shown in FIG. 11A, the signature of the reflector 66 is obtained within the range of 600–700 counts. To accurately position the hard drive arm 58, it is necessary to obtain the zero-crossing of the signal e(t) (shown as $O_c$ in FIG. 4). The output signals $e_1(t)$, $e_2(t)$, $e_3(t)$ and $e_4(t)$ are used to make this determination. With reference to FIG. 11B, the output signals $e_1(t)$, $e_2(t)$, $e_3(t)$ and $e_4(t)$ respectively represent the values of: $(A-B)_H$ which includes a range of positive values of e(t), $(A-B)_L$ which includes a range of negative values of e(t), (A>B), and (A+B).

Prior to writing servo information on the disk of the disk drive assembly 56, the position of the hard drive arm 58 is unknown, so the master arm 54 is scanned across its range to look for the sequence of signals which identify the reflector 66 on the hard drive arm 58. The signals captured by the control computer of the servo writing system 50 includes the digitized (about 12 to 16 bits) position of (A–B) (i.e. $e_d(t)$) as well as the four outputs $e_1(t)$, $e_2(t)$, $e_3(t)$ and $e_4(t)$ which are provided as four single bits from the four comparators 127 a–d. One aspect of the present invention provides a technique of monitoring the state of these signals to provide the profile or identification of the light reflected off reflector 66.

FIG. 11E is a graph of the signal e(t) or (A–B) with respect to sample position also illustrating the states used in the identification of the reflector 66 during the initial servo scan. In one embodiment, the state transitions are monitored using a computer and are used in locating the preferred operational points in servo writing. FIG. 11F is a graph of the signal $e_4(t)$ or (A+B) with respect to sample position, illustrating the states used in the identification of the reflector 66 during the initial servo scan.

The sequence of states shown in FIGS. 11E and 11F are monitored by means of a software state machine. The sample numbers are recorded at the transition points a, b, c, d, e, f, g and the position of the master arm 54 is recorded at the candidate zero crossing, transition d. If the intervals or durations of the various states satisfy limits obtained from previous calibration scans, then the zero transition d is known to be valid. In that case, the master arm 54 is returned to the position recorded at d and the second servo loop is closed to force the hard drive arm 58 to follow the master arm 54. If the correct sequence is violated at any point, then the state is reset to 0 and the search begins again. This technique of locating the zero crossing at transition d enables the servo loop to be closed near the zero crossing when the master arm 54 and the hard drive arm 58 coincide. During servo writing, the preferred operational point of the system is within the range c–e, with point d being the ideal operational point.

The various states monitored by the state machine will now be described. In particular, as shown in FIGS. 11E and 11F, eight states, state 0 to state 7, are utilized in identifying the signature of the reflector 66. The transition from state 0 to state 1 (at point a), occurs when (A+B) rises above the sum threshold. The transition from state 1 to 2 (at point b), occurs when the signal (A–B) rises above the difference threshold, while the transition from state 2 to 3 (at point c) occurs when the signal (A–B) falls below the difference threshold. The transition from state 3 to 4 (at point d) occurs when the signal (A–B) becomes a negative value. The transition from state 4 to 5 (at point e) occurs when the signal (A–B) falls below the negative of the difference threshold, while the transition from state 5 to state 6 (at point f) occurs when the signal (A–B) rises above the negative of difference threshold. Finally, the transition from state 6 to state 7 (at point g) occurs when the signal (A+B) falls below the sum threshold.

Figure 12:
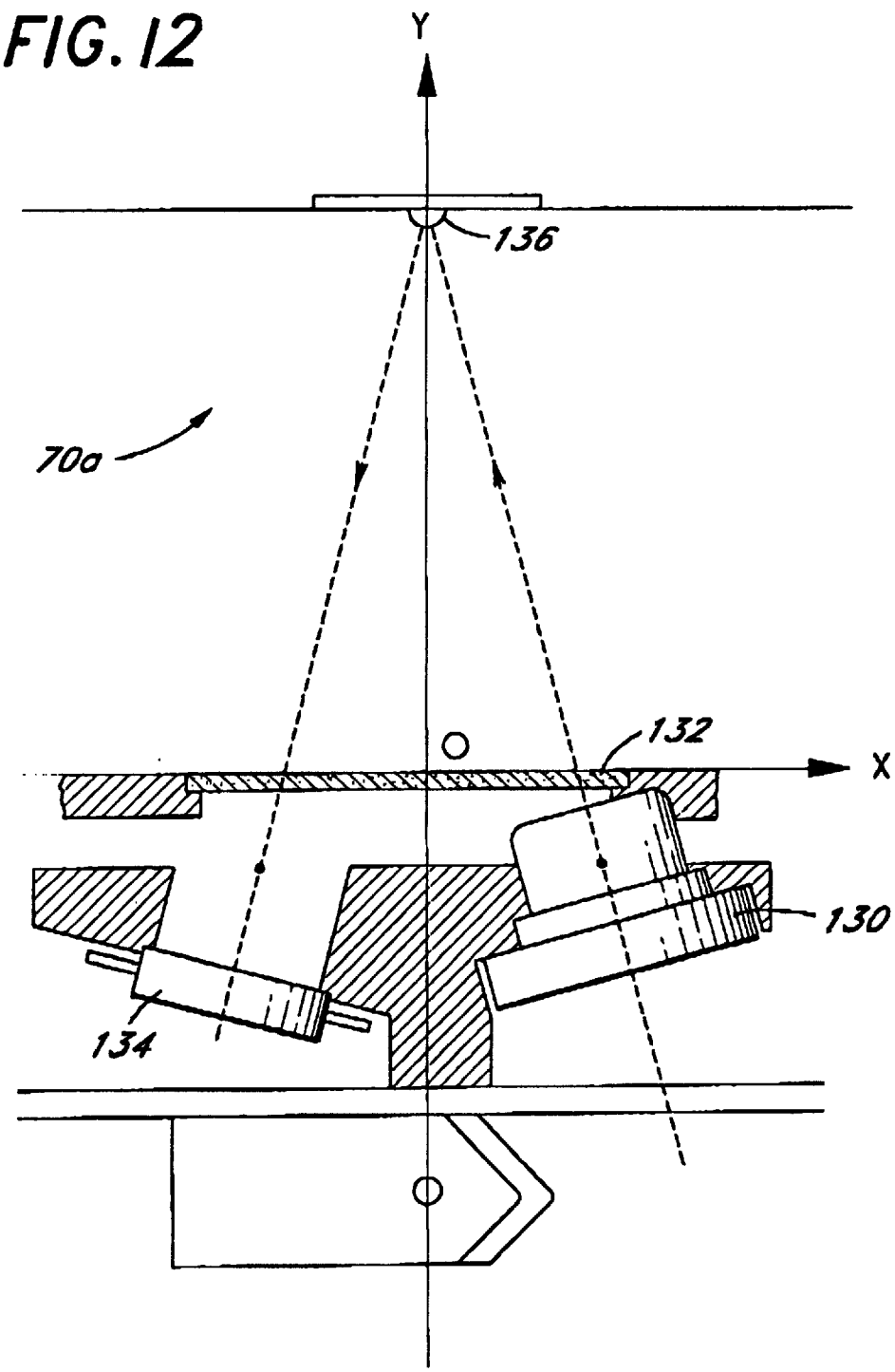
FIG. 12 illustrates one embodiment of the optical link assembly utilized in the non-contact servo writing system of the present invention.

FIG. 12 illustrates one embodiment of an optical link assembly 70a utilized in the non-contact servo writing system of the present invention. The optical link assembly 70a comprises a laser diode 130, a filter 132, a photodetector 134 and a reflector 136. The laser diode 130, filter 132 and photodetector 134 are mounted on the master arm 54, while the reflector 136 is mounted on the hard drive arm 58. The laser diode 130 and the photodetector 134 are mounted at an angle with respect to the surface of the master arm 54 so that the emitted light will be reflected by the reflector 136 at an angle within a desired range for detection. The emitted light and reflected light are filtered by filter 132. Exemplary laser diodes for this application include that manufactured by Hitachi, Inc. under the part designation HL6724MG and that manufactured by Sanyo, Inc. under the part designation DL3149. An example of the photodetector 134 includes a quad circuit manufactured by Hamamatsu, Inc. under the part designation S6242, while a typical filter material for this application is sold by Optima, Inc. The orientation of this embodiment is, however, sensitive to axial (y-direction) motion of the reflector 136. Any motion along the y-axis would result in the introduction of a spurious signal suggesting a false motion in the x-direction.

Figure 13:
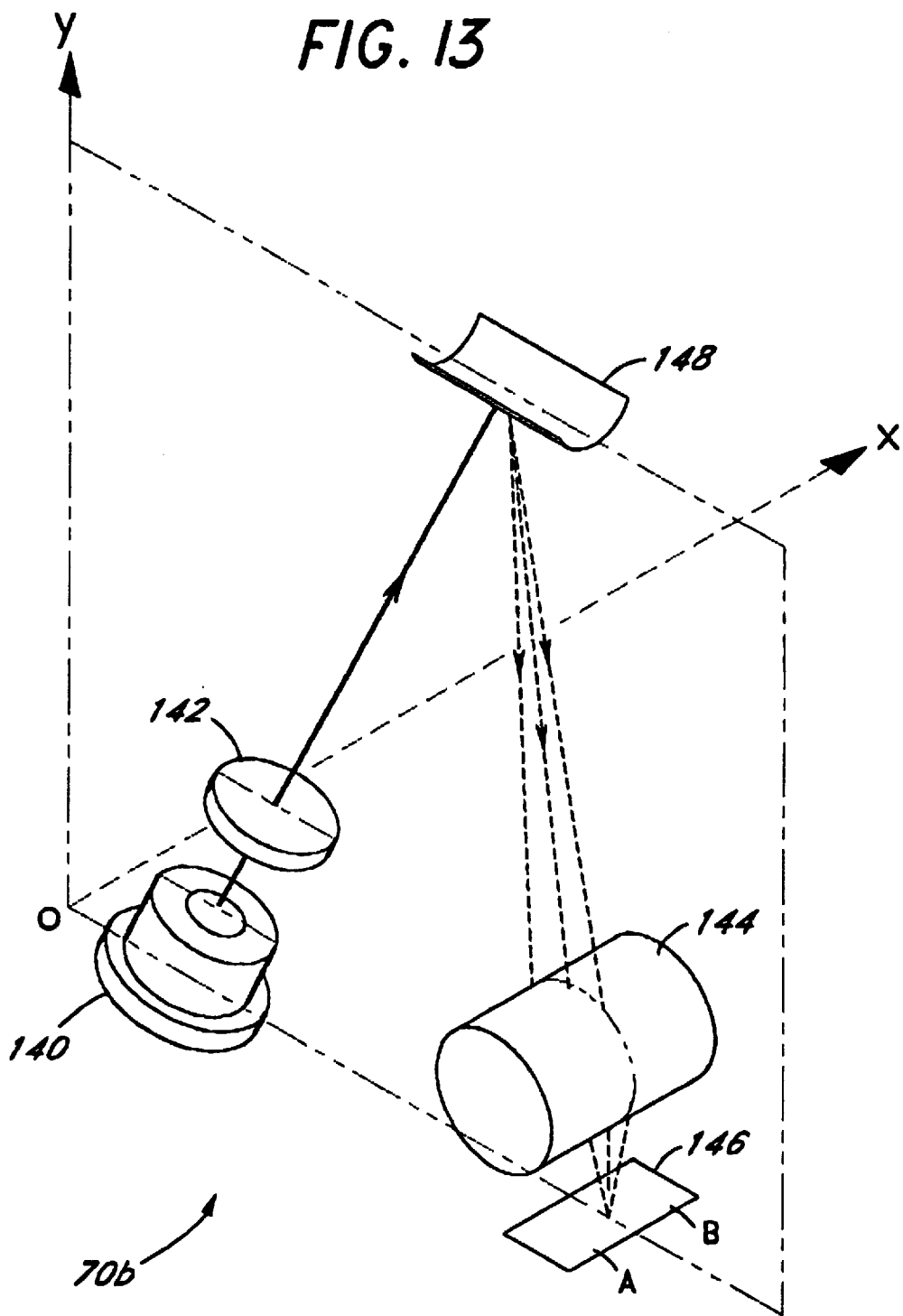
FIG. 13 illustrates a second embodiment of the optical link assembly utilized in the non-contact servo writing system of the present invention.

FIG. 13 illustrates a second embodiment of the optical link assembly 70b utilized in the non-contact servo writing system of the present invention. This orientation overcomes the axial motion problems of the first embodiment. The optical link assembly 70b comprises a laser diode 140, a collimating or focusing lens 142, a cylindrical objective lens 144, a photodetector 146 and a reflector 148. The laser diode 140, collimating lens 142, objective lens 144 and photodetector 146 are mounted on the master drive arm 54, while the reflector 148 is mounted on the hard drive arm 58. Light emitted by the laser diode 140 is focused by the collimating lens 142 and directed towards reflector 148, which reflects the light towards the objective lens 144. The objective lens 144 focuses the light rays onto the photodetector 146, which generates a signal representing the position of the hard drive arm 54. In the embodiment of FIG. 13, the centers of the laser diode 140, the collimating lens 142, the objective lens 144, and the photodetector 146 all lie in a plane that runs through the longitudinal axis of the reflector 148. This arrangement eliminates errors due to axial motion in an arrangement such as that of FIG. 12, where the centers of the laser diode 130 and the photodetector 134 lie in a plane that is perpendicular to the longitudinal axis of the reflector 148. In one embodiment, the photodetector 146 includes a dual element photodiode 110 as shown in FIG. 11A. In another embodiment, the circuitry for processing the signals generated by the dual element photodiode 110 may be located away from the hard drive arm 58.

FIG. 14 illustrates a third embodiment of the optical link assembly 70c utilized in the non-contact servo writing system of he present invention. The optical link assembly 70c includes a laser diode 150, a photodetector 152 and a mirror 154 which are located on the master drive arm 54. A reflector 156 is located on the hard drive arm 58. In one embodiment, the photodetector 152 includes a dual element photodiode 110 as shown in FIG. 11A. As shown in the Figure, the reflecting face of the mirror 154 faces the laser diode 150 and the photodetector 152, and one axis of the reflecting face lies along the y axis. The x-axis runs along a line perpendicular to the center of the reflecting face of the mirror 154, and the reflecting face is tilted at a 45° angle from the z-axis. The reflector 156 lies along the z axis, at a height h above the center of the reflecting face of the mirror 154. In operation, light emitted by the laser diode 150 is directed towards the mirror 154, which reflects the emitted light towards the reflector 156. Upon reflection, the light is directed back towards the mirror 154, which directs the reflected light towards the photodetector 152.

By implementing the present invention, optical link between a hard drive arm and a master arm in a servo writing system is provided, thereby eliminating positional errors introduced in mechanical push-pin servo writing systems. In addition, the position of the transducer heads in a hard drive assembly may be accurately determined and retained by the use of the present invention. As a result, the usefulness of the signal generated by a position sensor used in controlling the location of the transducer head may be increased.

The present invention may be embodied in other specific forms without departing from its spirit or essential characteristics. The described embodiments are to be considered in all respects only as illustrative and not restrictive. The scope of the invention is, therefore, indicated by the appended claims rather than the foregoing description. All changes which come within the meaning and range of equivalency of the claims are to be embraced within their scope.

I claim:

1. An apparatus for use in positioning a transducer located on a hard drive arm, comprising:

a light source for providing a light beam;

a reflector mounted to the hard drive arm for reflecting the light beam;

a sensor for receiving the reflected light, the sensor generating a signal in response;

a storage element coupled to said sensor that stores a maximum and a current value of said signal; and a servo controller coupled to the sensor and the storage element for controlling the hard drive arm in response to the maximum and the current values of said signal.

2. The apparatus of claim 1, wherein the sensor has a circuit having a first photosensing element and a second photosensing element, the circuit generating a first signal and a second signal proportional to the amount of reflected light received by the first photosensing element and the second photosensing element respectively, the sensor providing a sensor output signal representative of the difference between the first signal and the second signal.

3. The apparatus of claim 1, wherein the sensor receives light reflected off a reflector located on a hard drive arm.

4. The apparatus of claim 3, wherein the reflector has a longitudinal axis which lies in a plane which is perpendicular to a center of the laser diode and a center of the sensor.

5. The apparatus of claim 3, further comprising a mirror for directing the light beam towards the reflector and for directing the reflected light beam towards the sensor.

6. The apparatus of claim 1, further comprising a lens positioned adjacent to the source.

7. The apparatus of claim 6, wherein the lens is an objective lens.

8. The apparatus of claim 1 further comprising a lens positioned adjacent to the sensor.

9. The apparatus of claim 1, further comprising a filter located adjacent to the sensor and the source.

10. The apparatus of claim 1, further comprising:

an analog-to-digital converter coupled to receive the signal, the analog-to-digital converter for digitizing the signal; and a storage unit clocked to receive the digitized signal.

11. An apparatus for use in positioning a transducer in servo writing, the transducer being mounted on a hard drive arm comprising:

a master disk drive assembly having a master arm;

a light source mounted on the master arm for providing a light beam;

a reflector mounted to the hard drive arm for reflecting the light beam;

a sensor including a circuit having a first photosensing element and a second photosensing element, the circuit generating a first signal and a second signal proportional to the amount of reflected light received by the first photosensing element and the second photosensing element respectively, said circuit having a storage element that stores a maximum and a current value of said first and second signals, the sensor providing a sensor output signal representative of the difference between the first signal and the second signal, based on the maximum values of said first and second signals and the current values of said first and second signals; and a servo controller coupled to the sensor for controlling the hard drive arm in response to the sensor output signal.

12. The system of claim 11, further comprising:

an analog-to-digital converter coupled to receive the sensor output signal, the analog-to-digital converter for digitizing the sensor output signal; and a storage unit clocked to receive the digitized sensor output signal.

13. The system of claim 11, wherein the reflector comprises a substrate having a first section and a second section, wherein a plurality of glass beads are located over the first section.

14. The system of claim 13, wherein the first section of the substrate is coated with a reflective paint prior to locating the plurality glass beads, and wherein the second section is coated with a non-reflective paint.

15. The system of claim 11, further comprising:

a laser interferometer coupled to detect the position of the master arm, the laser interferometer providing an interferometer signal representative of the position of the master arm; and a second servo controller coupled to receive the interferometer signal, the second servo controller providing a second controller signal to the master arm to position the master arm.

16. An apparatus for use in positioning a transducer in servo writing, the transducer being mounted on a hard drive arm having at least one magnetic data storage disk, comprising:

a master disk drive assembly having a master disk drive arm;

a light source mounted on the arm which provides a light beam;

a reflector mounted on the hard drive arm which reflects the light beam, the reflector comprising a substrate having a first section and a second section, wherein a plurality of glass beads are located over the first section and wherein the second section is coated with a non-reflective paint;

a sensor for receiving the reflected light, the sensor providing a signal indicative of the position of the hard drive arm with respect to the master arm;

a storage element coupled to said sensor that stores a maximum and a current value of said signal; and a servo controller coupled to the sensor and to the storage element for controlling the hard drive arm in response to the maximum and the current values of the signal.

17. The system of claim 16, wherein the first section is coated with a reflective paint prior to locating the plurality of the glass beads over the first section.

18. A method for positioning a transducer in servo writing, the transducer being mounted on a hard drive arm, comprising the steps of:

providing a light beam;

reflecting the light beam off the hard drive arm;

sensing the reflected light beam;

generating a signal in response to the reflected light beam;

storing a maximum value and a current value of said signal; and moving the hard drive arm in accordance with the maximum and the current values of said signal.

19. The method of claim 18, wherein the step of sensing the light comprises the step of sensing the light with a sensor including a circuit having a first photosensing element and a second photosensing element, and wherein the step of generating a signal comprises the steps of:

generating a first signal and a second signal proportional to the amount of reflected light received by the first photosensing element and the second photosensing element respectively, and providing a signal representative of the difference between the first signal and the second signal.

20. The method of claim 18, wherein in the step of reflecting the light beam, the light beam is reflected off a reflector located on the hard drive arm.

21. The method of claim 20, wherein the light beam is generated by a light source and the reflected light beam is sensed by a sensor.

22. The method of claim 21, wherein in the step of generating a signal, the reflector has a longitudinal axis which lies in a plane which is perpendicular to a center of the laser diode and a center of the sensor.

23. The method of claim 21, further comprising the step of providing a mirror for directing the light beam towards the reflector and for directing the reflected light beam towards the sensor.

24. The method of claim 21, further comprising the step of providing a lens positioned adjacent to the source.

25. The method of claim 24, wherein the step of providing a lens includes providing an objective lens.

26. The method of claim 21, further comprising the step of providing a lens positioned adjacent to the sensor.

27. The method of claim 21, further comprising the step of providing a filter located adjacent to the sensor and the source.

28. A method for use in positioning a transducer in servo writing, the transducer being mounted on a hard drive arm, the method comprising the steps of:

providing a light beam;

reflecting the light beam off the hard drive arm;

sensing the reflected light beam with a sensor including a circuit having a first photosensing element and a second photosensing element, the circuit generating a first signal and a second signal proportional to the amount of reflected light received by the first photosensing element and the second photosensing element respectively, storing a maximum and a current value of said first and second signals, the sensor providing a sensor output signal representative of the difference between the first signal and the second signal based on the maximum values of said first and second signals and the current values of said first and second signals; and moving the hard drive arm in accordance with the sensor output signal.

29. The apparatus of claim 28, further comprising the steps of:

digitizing the sensor output signal; and storing the digitized sensor output signal.

30. A method of positioning a transducer located on a disk drive arm in a servo writing system, comprising the steps of:

providing a light beam;

reflecting the light beam off the hard drive arm;

sensing the reflected light with a sensor having a circuit including a first photosensing element and a second photosensing element;

generating a first signal and a second signal proportional to the amount of reflected light received by the first photosensing element and the second photosensing element respectively;

storing a maximum and a current value of said first and second signals;

providing a sensor output signal representative of the difference between the first signal and the second signal, to the sum of the first signal and the second signal, said sensor output signal being based on the maximum values of said first and second signals and the current values of said first and said second signals; and moving the hard drive arm in accordance with the sensor output signal.

31. The method of claim 30, further comprising the steps of:

digitizing the sensor output signal; and storing the digitized sensor output signal.

32. The method of claim 31, wherein the step of providing the second disk drive assembly includes the step of providing a reflector comprising a substrate having a first section and a second section, the plurality of glass beads located over the first section.

33. The method of claim 32, wherein the step of providing a reflector includes the steps of coating the first section with a reflective paint prior to locating the glass beads over the first section and coating the second section with a non-reflective paint.

34. The method of claim 30, further comprising the steps of:

detecting the position of the master arm and providing a position signal representative of the position of the master arm; and adjusting the position of the master arm in accordance with the position signal.

35. The method of claim 30, further comprising the step of:

monitoring the stored digitized sensor output signal; and adjusting the position of the disk drive arm in accordance with the digitized sensor output signal.

36. A method of positioning a transducer located on a disk drive arm in a servo writing system, comprising the steps of:

providing a light beam;

reflecting the light beam off a reflector mounted on the disk drive arm, the reflector comprising a substrate having a first section and a second section, wherein a plurality of glass beads are located over the first section, and the second section is coated with a non-reflective paint;

sensing the reflected light;

providing a signal indicative of the position of the hard drive arm;

storing a maximum value and a current value of said signal:

generating an output signal based on said maximum and said current values of said signal; and adjusting the hard drive arm in accordance with the output signal.

37. The method of claim 36, wherein the step of providing a reflector includes the steps of coating the first section with a reflective paint prior to locating the glass beads over the first section.

* * * * *